Nov. 15, 1932.  D. BERG  1,887,574

NONDAZZLING HEADLIGHT FOR AUTOMOBILES AND THE LIKE

Filed Jan. 30, 1932  4 Sheets-Sheet 1

Nov. 15, 1932.  D. BERG  1,887,574
NONDAZZLING HEADLIGHT FOR AUTOMOBILES AND THE LIKE
Filed Jan. 30, 1932  4 Sheets-Sheet 2

Inventor
Ditler Berg
By Ashton, Parker, Morse & Grindle
Attys

Nov. 15, 1932.                D. BERG                  1,887,574
              NONDAZZLING HEADLIGHT FOR AUTOMOBILES AND THE LIKE
                        Filed Jan. 30, 1932      4 Sheets-Sheet 3

Inventor
Dietler Berg
By Watson, Cort, Morse & Grindle
Attys

Nov. 15, 1932.   D. BERG   1,887,574
NONDAZZLING HEADLIGHT FOR AUTOMOBILES AND THE LIKE
Filed Jan. 30, 1932   4 Sheets-Sheet 4

Patented Nov. 15, 1932

1,887,574

UNITED STATES PATENT OFFICE

DITLEV BERG, OF HELLERUP, NEAR COPENHAGEN, DENMARK

NONDAZZLING HEADLIGHT FOR AUTOMOBILES AND THE LIKE

Application filed January 30, 1932, Serial No. 589,944, and in Denmark January 30, 1931.

It is well known that the automobile headlights now in use are unsatisfactory and, at times dangerous to use as they emit rays having frequently a dazzling effect on other users of the road. This circumstance may be the cause of accidents and a certain uneasiness on the part of the driver, so that careful automobile drivers dare not fully utilize the possible speed of the vehicle.

In the ordinary used headlights the reflector consists of a brightly polished paraboloid of rotation of metal with, nearly in all cases, an electric source of light disposed at or near the focus of the paraboloid. With a paraboloid reflector with its source of light at the focus it is well known that all the light received by the reflector will be reflected as a beam of rays parallel to the axis of rotation of the paraboloid, provided that the source of light be of such small bodily dimensions that it can be considered one single point.

Any source of light, however, is of appreciable size i. e. it extends outside of the mathematical axis of the paraboloid. Even if the centre of the source of light co-incides with the focus, the rays of light will therefore not leave the reflector as a bundle of solely parallel rays, but rays will also be emitted in many various directions and, especially, not only in downward direction, which rays will not have any dazzling effect on the opposing traffic, but also in upward direction. Just these ascending rays are the ones that form a great nuisance on the roads, and preferably should be avoided entirely.

The present invention solves this problem of dazzling, and is accurately described and defined in the following.

In order to understand the invention it is necessary, however, first to set forth a complete statement of the path of the rays under various conditions in and from a paraboloid reflector, and the following explanation is such a statement and is based upon a concise descriptive-geometrical research of the conditions at hand.

The drawings illustrate a portion of this research.

Figure 9:
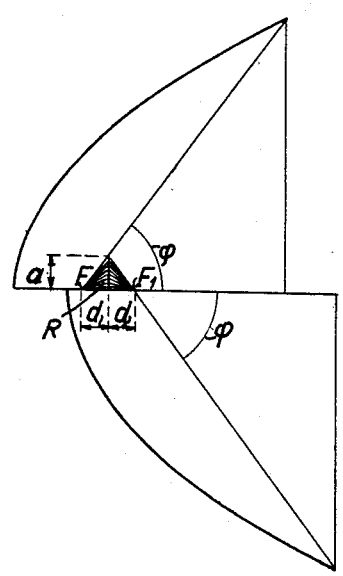
Figure 10:
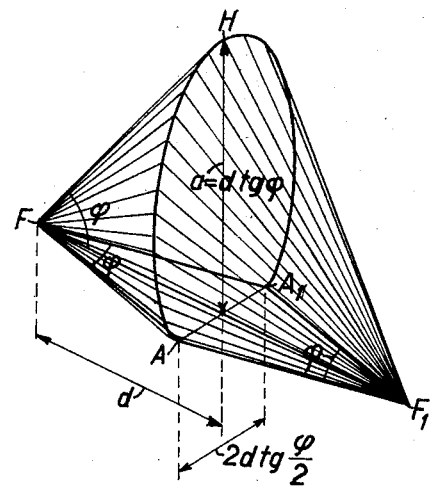
Figure 11:
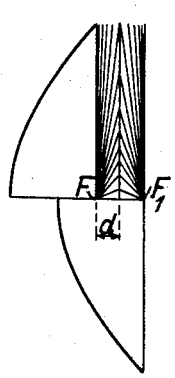
Figure 12:
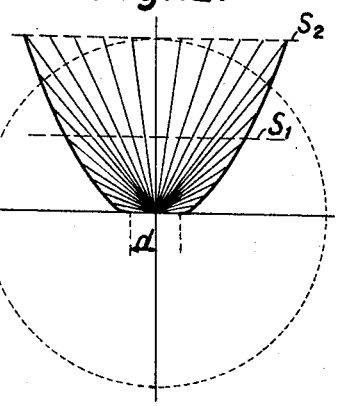
Figure 13:

Figs. 1, 3, 5, 7, 9 and 11 show vertical axial sections of various paraboloid reflectors, Figs. 2, 4, 6, 8 and 12 show corresponding views in the direction of the axis of the paraboloid, and Figs. 10 and 13 show other details.

Figure 1:
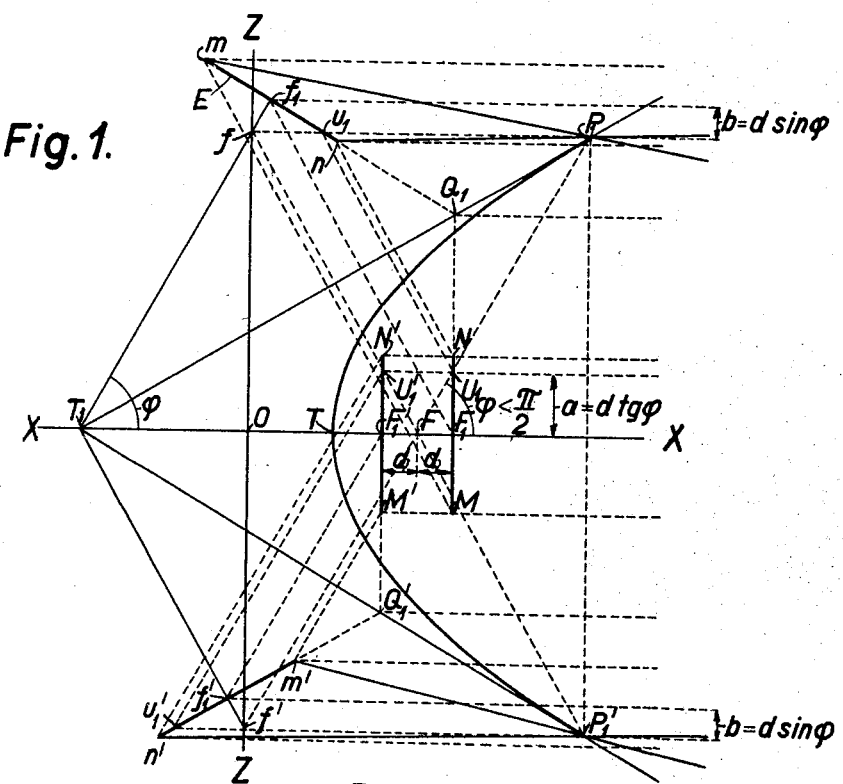

The following descriptive-geometrical researches are based upon the assumption that there is provided, in a paraboloid reflector and at a certain distance from the focus thereof, a light-emitting circular disc without thickness and having its centre situated in the axis of the paraboloid and its plane perpendicular to the said axis. In Fig. 1 the disc is shown as a line MN, intersecting the reflector axis at a point $F_1$, and the distance from the focus F to the disc is marked $d$. An arbitrary circle on the paraboloid is shown as a line $P_1$ $P_1'$, and the angle between radius vector from the focus F to the point $P_1$ and the axis X of the paraboloid is marked $\phi$.

As it is well known a ray of light emitted from a point and hitting a point of a reflecting plane will be reflected from this plane along a straight line determined by the last mentioned point and the mirror image of the first mentioned point. If the reflecting surface is curved, the tangential plane to the latter at the point hit by the ray of light replaces the above mentioned reflecting plane.

The tangent plane to an arbitrary point $P_1$, Fig. 1, in the vertical axial plane of the paraboloid is depicted, in ordinary rectangular projection, as the tangent $T_1$ $P_1$ to the point $P_1$. The tangent plane, which is perpendicular to the axial plane (the XZ-plane, where Z is the directrix of the parabola) is considered to be reflecting. The mirror image of the plane $F_1$ $Q_1$ of the mirror image of the light-emitting disc MN is shown as a line $f_1$ $Q_1$, and the three planes, viz the plane $F_1Q_1$ of the luminous disc $F_1Q_1$, the tangent plane $T_1P_1$ to the point $P_1$ and the plane of the mirror image of the luminous disc, are all passing through the line which is depicted as the point $Q_1$ and is perpendicular to the XZ-plane.

A point $f$ of the generatrix of the diametral parabola (the Z-axis) is the mirror image of the focus F. The point $f_1$ is mirror image of the centre $F_1$ of the luminous disc MN, and the mirror image of the latter is a circle depicted as a line $m\ n$ in the plane $f_1Q_1$ and with its centre at $f_1$. The line $T_1f_1$ is the mirror image of the piece $T_1F_1$ of the axis of the paraboloid, and the piece of line $ff_1$ is the mirror image of the piece of line $FF_1=d$. The line $P_1f$, which is parallel to the axis of the paraboloid is the mirror image of radius vector $FP_1$ to the point $P_1$, and the point of intersection $u_1$ between the line $P_1f$ and the plane $mQ_1$ of the mirror image of the luminous disc is the mirror image of the point of intersection $U_1$ between the plane $F_1Q_1$ of the disc MN and radius vector $FP_1$ to the point $P_1$.

Figure 2:
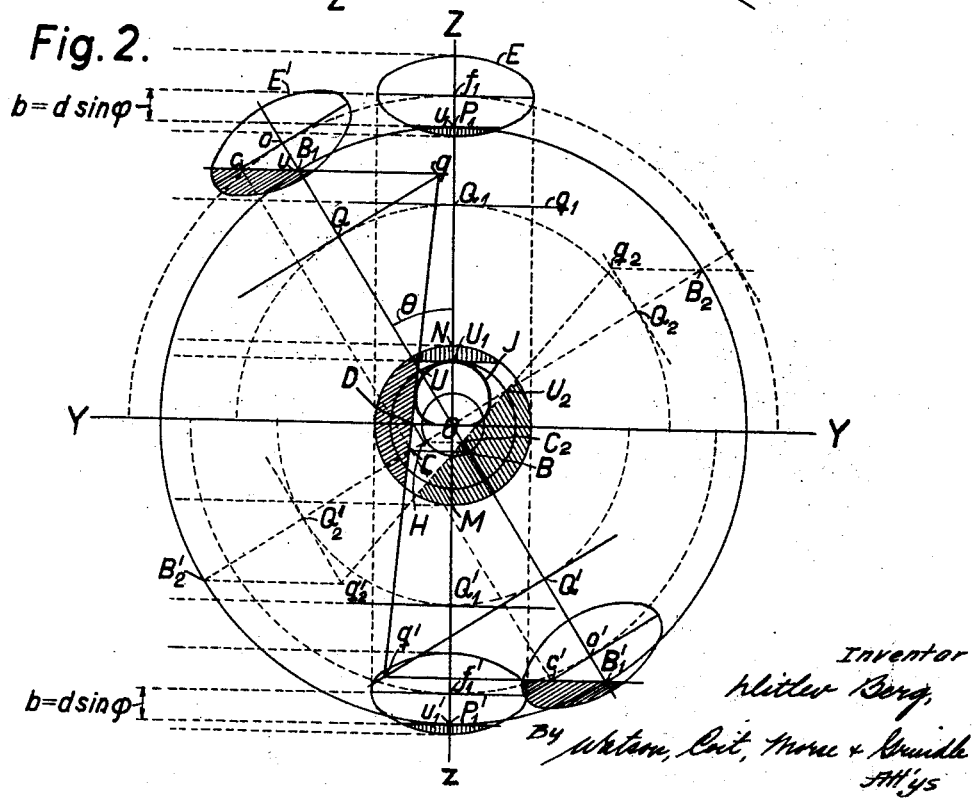

Fig. 2 shows, corresponding to Fig. 1, a projection on a plane perpendicular to the X-axis and passing through the Z-axis, i. e. in the Z—Y plane, of the circle $P_1\ P_1'$ and the luminous disc MN as well as the mirror image of the latter, which image is shaped as an ellipse whose axis major is parallel to the Y-axis and is the mirror image of the horizontal diameter of the luminous disc in the XY-plane, while the line $Q_1q_1$ is the projection of the line of intersection between the plane of the luminous disc and the plane of the mirror image of the same, and is tangent to a circle with centre at O and with radius $OQ_1=F_1Q_1$ in Fig. 1. Each point in the plane of the luminous disc corresponds to a point of the mirror image thereof, and vice versa. To each line passing through the point $u_1$ in the plane of the mirror image corresponds a line passing through the point $U_1$ and situated in the plane of the disc, Figs. 1 and 2, and any two of these corresponding lines will intersect one another in the line of intersection $Q_1q_1$ of the said two planes.

The rays of light emitted from the disc MN, Fig. 1, and reflected from the point $P_1$ will after the reflection be directed as if they were emitted from the circular mirror image $m\ n$ of the disc, Fig. 1, and they will form a cone the vertex of which is $P_1$, and the generatrix of which is the circle $m\ n$. The outline of this cone is indicated in Fig. 1, viz. the triangle $P_1\ m\ n$.

In order to examine how the conditions will be for an arbitrary point $B_1$ situated on the same circle of the paraboloid as the point $P_1$, I may rotate this point together with its tangent plane etc. through an angle $\Theta$ about the X-axis, so that the point $P_1$ co-incides with the point $B_1$. The tangent plane to $P_1$ will then co-incide with the tangent plane to $B_1$, and the mirror image of the luminous disc with reference to the tangent plane of the paraboloid at the point $B_1$ will then be the ellipse $E'$ shown in Fig. 2. The entire thing will be congruent to what is shown for the point $P_1$, the line $OP_1f_1$, Fig. 2, being merely replaced by the line $OB_1o$, which forms the angle $\Theta$ with the Z-axis. The rays of light emitted from the luminous disc and reflected from the point $B_1$ of the paraboloid will form a cone the vertex of which is $B_1$ and the directrix of which is the mirror image of the luminous disc projected as the ellipse $E'$. When now a horizontal plane is laid through the point $B_1$, this plane will intersect the mirror image of the luminous disc along a line $c\ u\ q$, which is parallel to the Y-axis and divide the ellipse $E'$ into two parts, an upper one and a lower one, and which similarly divides the conical bundle of reflected rays of light into two parts. Out of these rays the ones starting from the part of the mirror image situated above the line $c\ u\ q$ will be sloping downward and, consequently, not have any dazzling effect, while the rays of light starting from the part of the mirror image situated below this line will all be directed upward and, consequently, be dazzling. The rays of light starting from the horizontal line of intersection itself will be situated in the horizontal plane through the point $B_1$ and will form the transition from the dazzling to the non-dazzling rays of light. In Fig. 2 the dazzling part of the mirror image is cross-hatched, and will be seen immediately to correspond to the cross-hatched part of the luminous disc, which is determined by the line $qUC$, whose mirror image is the line $c\ u\ q$, as the line $Qq$, which is tangent, at the point Q, to a circle the centre of which is the point O and the radius of which is $OQ=F_1Q_1$ in Fig. 1, is the line of intersection between the plane of the luminous disc and the plane of the mirror image of the latter, and the point $c$ of the axis major of the ellipse is the mirror image of the point C on the diameter of the luminous disc perpendicular to the line OB. The mirror image of the point U is $u$, the projection of which on the YZ-plane co-incides with the point $B_1$, since the line $B_1u$ is parallel to the X-axis. The luminous disc is consequently divided, by the line UC, into two parts, one of which is cross-hatched and the other one is not cross-hatched, and a ray of light starting from the part of the disc that is not cross-hatched will after the reflection from the point $B_1$ be directed downward and consequently not be dazzling, while any point of the cross-hatched part of the luminous disc will emit rays of light having after reflection from $B_1$ an upward direction and, consequently, a dazzling effect. The rays of light starting from points on the line UC itself will after reflection from the point $B_1$ of the paraboloid be situated in the horizontal plane through this point and will form the transition between the dazzling and the non-dazzling rays of light.

The line UC, which corresponds to the moving point $B_1$ is determined in the following manner, as it will now be understood from the above explanation.

With the point O as the centre two circles are drawn, viz. one with a radius equal to $a = OU = OU_1 = F_1U_1$ in Fig. 1 and the other one with a radius equal to $b = OB = oB_1 = P_1f_1$ in Fig. 2. Fig. 1 shows that $a = d \cdot tg\, \phi$ and as $ff_1$, Fig. 1, is equal to $d$, we have $b = d \sin \phi$ where $\phi$ is the angle between the axis of the paraboloid and radius vector to any point of the circle $P_1P_1'$ on the paraboloid.

From the arbitrary point $B_1$ on the circle $P_1P_1'$ the diameter $B_1OB_1'$ is drawn which intersects the said two circles with radius $a$ and $b$, respectively, at point U and B on either side of the common centre O. The line OC is drawn at right angles to the diameter $B_1B_1'$, and from the point B a line is drawn, which is parallel to the Y-axis, and the point of intersection of which with the line OC determines the point C and, thereby, also the line CU. The two triangles $ocB_1$ and OCB are congruent, since their sides are mutually parallel and of equal length.

Allowing now the point $B_1$ to move through the part of the circle $P_1P_1'$ that is situated above the XY-plane, the various lines CU will generate an envelope J for these lines as shown in Fig. 2. As a natural consequence of the manner of generation this curve is symmetrical with respect to the Z-axis as well as with respect to the Y-axis, but is only shown above the last mentioned axis. The curve has two cusps situated on the Y-axis, and the latter is tangent to the curve at both of these points. If a line is drawn passing through the point of intersection D of the line CU and the Y-axis and being parallel to the line $BB_1$, i. e. perpendicular to the line OC, then the said line will intersect the line OC at a point H, and by the use of equiangular triangles we find:

$$\frac{DH}{OU} = \frac{CD}{CU} = \frac{OB}{BU} = \frac{b}{a+b}.$$

Since OU is equal to $a$, we have now:

$$DH = \frac{a \cdot b}{a+b},$$

and DH is consequently constant for all the tangents of the curve, i. e. independent of $\theta$.

For $\theta$ equal to zero, U will co-incide with $U_1$, and C will be infinitely remote on the Y-axis. UC will be parallel to the Y-axis and will be tangent to the curve at the point $U_1$ on the Y-axis. For $$\theta = \pm \frac{\pi}{2}$$

CO will co-incide with the Y-axis, which is common tangent to the two cusps of the curve situated on the Y-axis.

The point D is seen to co-incide with a cusp, and as simultaneously H will co-incide with O, the distance of the cusp from O will be equal to $$\frac{a \cdot b}{a+b} < b.$$

By insertion of the values of $a$ and $b$ we find:

$$\frac{a \cdot b}{a+b} = d \cdot tg\frac{\phi}{2}.$$

All the various lines UC are tangents to the envelope, and the point of contact between the curve and each individual tangent, i. e. the running point of the curve, can be determined by geometrical construction.

From Fig. 2 as well as from the above explanation it follows that this curve is of importance in so far as rays of light emitted from any point of the portion of the plane of the luminous disc that is situated above the XY-plane and, at the same time, inside of the curve, when reflected from any point of the semi-circle forming the intersection between the plane $P_1P_1'$, Fig. 1, and the upper half of the paraboloid, will all be sloping downward and, consequently, will not have any dazzling effect, while this will not be the case for any other luminous point situated in the same plane. If $B_1$ is allowed to move along the part of the circle $P_1P_1'$ situated below the XR-plane, a similar examination will show that the plane of the luminous disc does not contain any point possessing the property that rays of light starting therefrom, after reflection from any point in the lower half of the circle $P_1P_1'$, will all be sloping downward. The lower semi-circle is therefore left out of consideration here.

Figure 3:
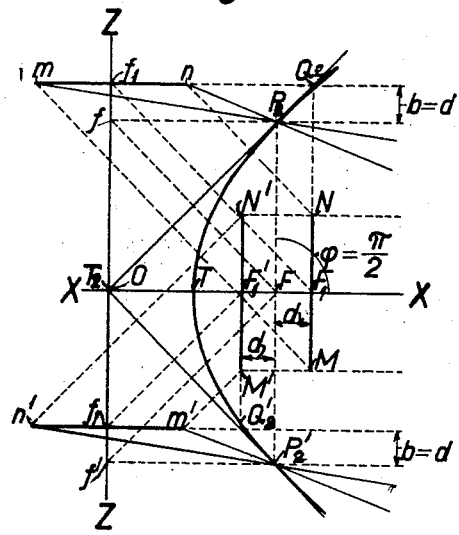
Figure 4:
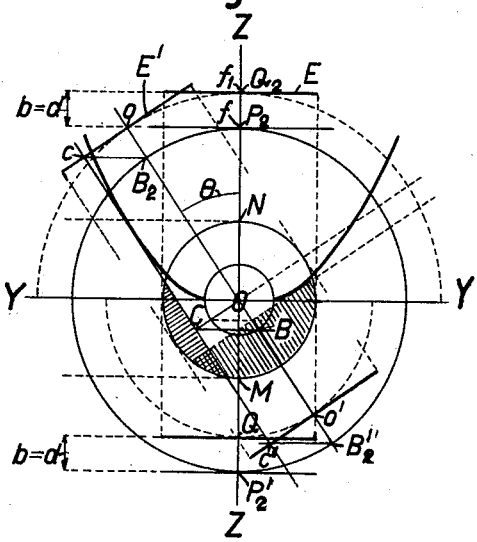

Allowing now the entire plane $P_1P_1'$ and, consequently, the considered reflecting semi-circle on the paraboloid to move towards the vertex T of the paraboloid, then the angle $\phi$ and, thereby, also $a = d \cdot tg\, \phi$ and $b = d \sin \phi$ will increase. The vertex $U_1$ of the curve J will therefore move upward, and when $$\phi = \frac{\pi}{2}$$

we have $a = \infty$, i. e. the envelope will have its vertex $U_1$ infinitely remote in the direction of the Z-axis, and the said envelope will therefore be of parabolic shape as appearing from Fig. 4, cf. Fig. 3. The curve consists of two separate branches, and the two cusps of the curve on the Y-axis will be situated at the points of intersection between the said axis and a circle with radius $b = d$, since $$d \cdot tg\frac{\phi}{2} = d.$$

Figure 5:
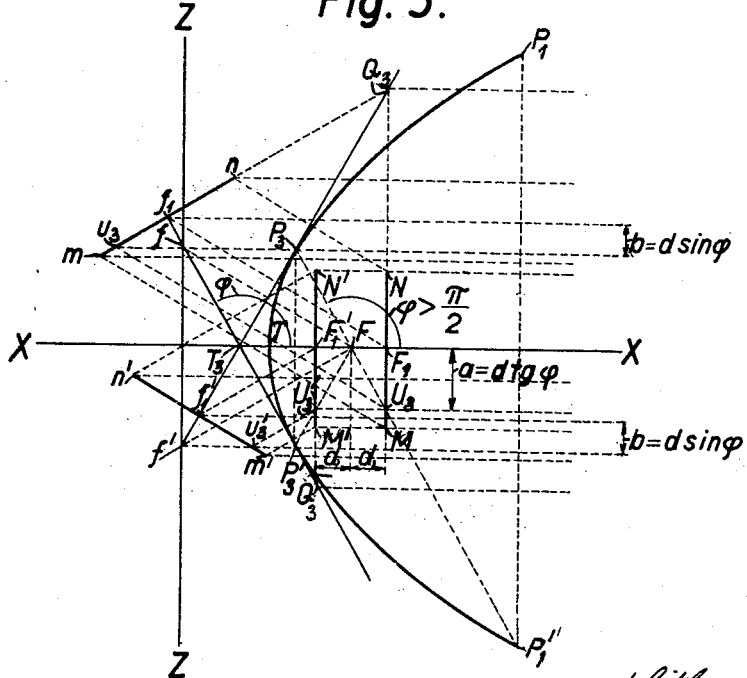
Figure 6:
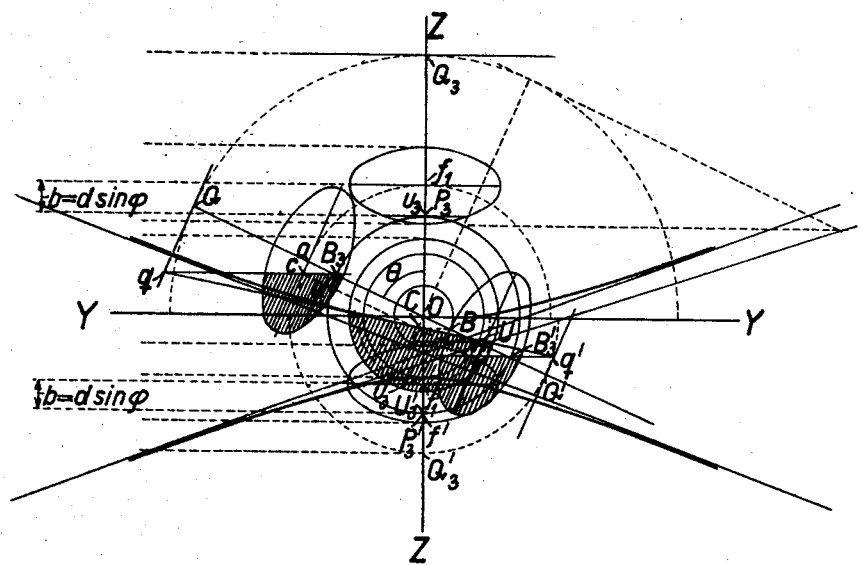

If the plane $P_1P_1'$ is moved further on to the part of the paraboloid situated inside of (behind) the plane passing through the focus F, for instance to the semi-circle through a point $P_3$, Fig 5, then the curve will change into hyperbolic shape, Fig. 6, the point $U_3$ being now situated on the same side of the centre O as B, so that $a = d \cdot tg\ \phi$ will be negative. The curve will then assume the shape shown in Fig. 6 with asymptotes, the position of which may be determined by geometrical means. They are, however, irrelevant to the present invention. The two cusps of the curve which are situated on the Y-axis have their distance from the initial pont o determined by $$d . tg\frac{\phi}{2} = \frac{a \cdot b}{a - b} > b.$$

The branch of the hyperbolic curve situated in the second quadrant corresponds to the lower part of the part of the closed envelope that is situated in the second quadrant and shown in Fig. 2, while the branch of the curve situated in the forth quadrant and extending from the point $U_3$ corresponds to the upper part of the closed envelope situated in the second quadrant, and the asymptote corresponding to the infinitely remote point of both branches corresponds to the tangent to the closed envelope that is parallel to the Z-axis.

Gradually as the reflecting circle situated in the plane $P_1P_1'$ moves from its outer position towards the vertex of the paraboloid, the angle $\phi$ will increase together with the distance from the initial point O to the cusps, the said distance being equal to $d \cdot tg\frac{\phi}{2}$, which for $\phi = \pi$ becomes $\infty$. The curve corresponding to each individual value of $\phi$ and, thereby, also to the non-dazzling part of the plane of the luminous disc situated inside of this curve will constantly and uniformly increase in size, each subsequent curve being always situated entirely outside the preceding one, until the hyperbolic curve for $\phi = \pi$ is reduced to and co-incides with the line of intersection between the plane of the luminous disc and the XY-plane, which means that the non-dazzling part of the plane of the luminous disc here includes the entire half of the plane situated above the XY-plane.

If $P_1P_1'$ indicates the front edge of the paraboloid, i. e. the limiting circle of the reflector, the above explanation will show that if the luminous circle is limited to the portion of the plane $F_1Q$ that is situated above the XY-plane and, at the same time, inside of the closed curve corresponding to the plane $P_1P_1'$ and, consequently to the angle $\phi$, see Fig. 2, then none of the rays emitted from the disc, when reflected from the upper half of the paraboloid, will be directed upward, and they will therefore not have any dazzling effect.

From the manner of generation of the curve it becomes evident that while the angle $\phi$ determines the type and shape of the curve (closed, parabolic or hyperbolic), the linear dimensions of the curve will otherwise be determined by the distance $d$. For one and the same $\phi$ all the linear dimensions of the curve will in fact solely depend on and be directly proportional to $d$, as the determining dimensions in this respect, viz. $a = d \cdot tg\ \phi$ and $b = d \cdot \sin \phi$ will both be directly proportional to $d$.

All curves with the same value of $\phi$ will therefore be similar, and if $d$ is allowed to vary, while $\phi$ is constant, the dimensions of the curve corresponding to each individual value of $d$ will be directly proportional to $d$, and all these curves will be situated on one and the same cone surface, the vertex of which is at the focus and the directrix of which is one of the curves.

Figures 7, 8:
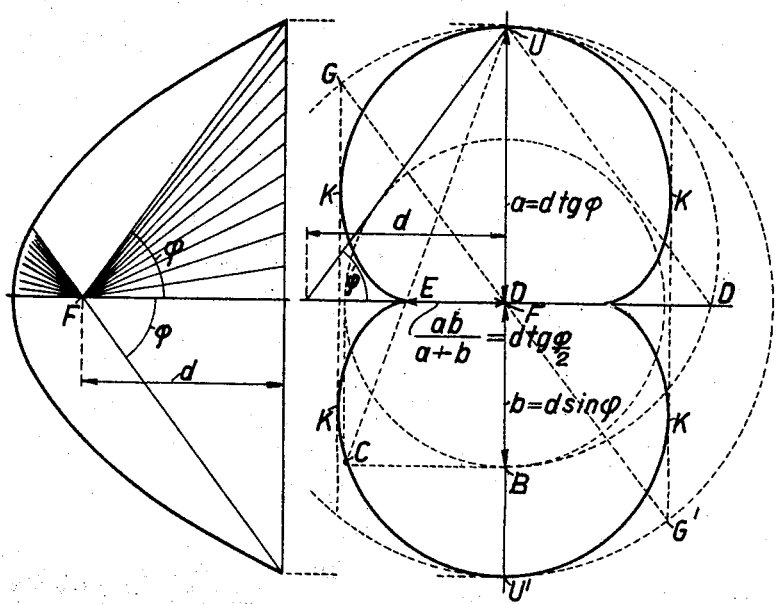

The above description shows that rays of light emitted from an arbitrary point situated above the horizontal plane through the axis of the paraboloid and also inside of a cone surface the vertex of which is the focus and the generatrix of which is one of the mutually similar curves corresponding to the angle $\phi$, for instance the curve which is situated in the boundary plane of the paraboloid and forms the opening of the same and is shown in Fig. 8, by reflection from an arbitrary point of the upper half of the paraboloid will all be sloping downward and, consequently, cannot have any dazzling effect. $\phi$ is the angle between the axis of the paraboloid and radius vector to the circle bounding the reflector and forming the opening of the reflector, see Fig. 7.

If now the luminous disc is placed behind the focus (at $M'N'$ in Fig. 1) and, like the disc MN, at a distance $d$ from the latter, then an analogous research will lead to exactly the same parts of the same curves situated above the horizontal plane, and will lead to entirely analogous results, provided that the lower half of the paraboloid be used instead of the upper half. This will be evident, with sufficient clearness, by an inspection of Figs. 1 to 6.

Here too a cone surface is found, the vertex of which is the focus, and which is congruent to the above mentioned cone but facing in the opposite direction, i. e. from the focus inward towards the vertex of the paraboloid, see Fig. 7. In analogy with the results found for the first mentioned cone surface we find here that rays of light emitted from an arbitrary point situated above the horizontal plane through the axis and, simultaneously, inside of the last mentioned cone surface, when reflected from any point of the lower half of the paraboloid, will all be sloping downward and, consequently, have no dazzling effect.

The result of the researches made here is consequently (1) That the condition to be filled in order that the rays of light reflected from the upper half of the paraboloid shall all be sloping downward and, consequently, not be dazzling is that the source of light shall be situated above the horizontal plane through the axis of the paraboloid and simultaneously inside of the cone surface shown in Fig. 7 and situated in front of the focus and having the above indicated shape, and (2) That the condition to be filled in order that the rays of light reflected from the lower half of the paraboloid shall similarly all be sloping downward, and, consequently, not be dazzling is that the source of light shall be situated above the horizontal plane through the axis of the paraboloid and also inside of the cone surface situated behind the focus and having the similarly indicated shape, see Fig. 7.

These two conditions are filled simultaneously by the combination of the following two arrangements, which combination forms the present invention, viz. that the paraboloid is divided by a horizontal plane passing through the axis thereof, and that the lower half is displaced a certain distance in forward direction, parallel to the axis, and that the source of light is disposed above the horizontal plane through the axis of the paraboloid and, simultaneously, inside of the space $R_1$ situated between the two focal points (for the two paraboloid halves) and bounded by the said two cone surfaces together, after the said displacement, see Fig. 9.

The above mentioned curve, which is novel and heretofore unknown in mathematics may suitably be called the "reflector curve" in agreement with the reason for which this curve is found here. The rectangular coordinates of the curve with reference to a horizontal X-axis and a vertical Y-axis with the initial point situated in the paraboloid axis are:

$$x = d \cdot \frac{\sin\phi \sin\theta \cdot \left(\cos^2\theta + \frac{1}{1+\cos\phi}\right)}{\sin^2\theta + \cos\phi \cdot \cos^2\theta}$$

and $$y = d \cdot \frac{\sin\phi \cos^3\theta}{\sin^2\phi + \cos\phi \cdot \cos^2\theta}$$

expressed as functions of $\theta$ varying from zero to $\pm\pi$. In the present case, however, only the part of the curve is used for which $\theta$ varies from zero to $\pm\pi$.

Fig. 8 shows, to a larger scale, the closed type of the reflector curve situated in the plane of the open front of the paraboloid shown in Fig. 7. The principal points of the curve are found in the following manner.

The point C is the point of intersection betweeen the tangents to the points of the $b$-circle situated on the X-axis and the Y-axis, respectively, and the line CU intersects the X-axis at one of the cusps of the curve. It is easily seen that the distance of the latter from the centre O is $$\frac{a \cdot b}{a+b} = d \cdot tg\frac{\phi}{2}.$$

A circle with diameter UB intersects the X-axis at D, and if a line is drawn through the centre O parallel to DU, the same will intersect the $a$-article at the points G and G' determining the two double tangents to the curve that are parallel to the Y-axis. Their points of contact with the latter are situated halfways between their points of intersection with the $a$-circle and the X-axis, respectively.

The above described space bounded by two cone surfaces is shown, to a larger scale, in Fig. 10. The boundaries of the said space is formed in the horizontal plane by a rhomb, one diagonal $FF_1$ of which has the length $2d$ equal to the distance between the focal points of the two paraboloid halves, and the other diagonal $AA_1$ of which has a length equal to $$\frac{2a \cdot b}{a+b}$$

or, when the values of $a$ and $b$ expressed by the angle $\phi$ are inserted, $$2d \cdot tg\frac{\phi}{2}.$$

The angles of the rhomb at the two focal points are therefore, as easily seen, equal to $\phi$, i. e. the angle between the topmost cone generatrix FH (or $F_1H$) and the common axis $FF_1$ of the paraboloid halves. The distance $a$ from the topmost point H of the directrix to the horizontal plane is equal to $d \cdot tg\,\phi$.

The space is thus exactly determined by the selected values of $\phi$ and $d$ or of the dimensions $a$ and $b$ depending thereon.

If the value of $d$ (the half distance between the two focal points) is maintained constant and, simultaneously, the angle $\phi$ is allowed to increase, so that the reflector is shortened, the available space for the luminous body will increase, because thereby the diagonal $AA_1$ of the rhomb as well as the height $a$ of the directrix will increase. At the same time, however, the fraction of the total quantity of light reflected by the reflector, i. e. the useful part of the quantity of light will decrease at a corresponding rate.

If the angle $\phi$ increases to the value $\frac{\pi}{2}$ the closed curve will change into the parabolic one, and the rhomb will become a square. The luminous body will have at its disposal a space bounded at bottom by the square and otherwise by the two cone surfaces with vertex at the focal points and having as their common directrix the parabolic form, see Figs. 4 and 12, of the envelope concerned. The space will then be open at top, so that the non-dazzling luminous body will not be limited in upward direction. A vertical longitudinal section containing the axis of the paraboloid intersects the cone surfaces along two vertical lines through the focal points, Fig. 11, and horizontal sections will be lens-shaped as shown in Fig. 13. By the said arrangement each reflector is limited to the position of the paraboloid situated behind the focus thereof, so that only 50% of the light emitted from the source of light will be utilized by reflection. On the other hand the great advantage will be attained that it will here be easier to place the source of light close to the focal points, because by this arrangement the latter will not be situated at the vertex of a cone as in the case of the closed space in Figs. 9 and 10, but in a corner, none of the angles of which is smaller than 90°, see Figs. 11 to 13, which is of importance, as the portion of the luminous body nearest to the focal points is the portion giving the strongest and, at the same time, the most far-reaching light.

The lower and the upper half paraboloids do not have to be congruent.

Having now particularly described and ascertained the nature of my said invention and in what manner the same is to be performed, I declare that what I claim is:

In headlights for automobiles, other vehicles and the like, the combination with a light source of a parabolic reflector formed by two half paraboloids of rotation with coincident axes and bounded by a common horizontal plane, the focus of the lower one of said half paraboloids being displaced somewhat in forward direction relatively to the focus of the upper one and in the direction of the axes, the light-emitting parts of said light source being disposed in such a manner that they will be situated above the said horizontal plane and also inside of two mutually opposed single cone surfaces having each for its vertex the focal point of the corresponding half paraboloid and having for their generatrices the following curves: for the cone surface with vertex at the rear focal point F the reflector curve situated in the plane perpendicular to the axis halfways between the focal points F and $F_1$ and being otherwise determined by having for the given distance $d$ and angle $\phi$, respectively, half the distance between the focal points and the angle between the axis of the upper half paraboloid and radius vector to the circle forming the front edge of the same half paraboloid, and for the cone surface with vertex at the front focal point $F_1$ the reflector curve situated in the plane perpendicular to the axis, halfways between the focal points F and $F_1$, and otherwise determined by having for the given distance $d$ and angle $\phi$, respectively, half the distance between the focal points and the angle between the axis of the lower half paraboloid and radius vector to the circle forming the front-edge of the same half paraboloid, the running point of the said reflector curve in a rectangular system of co-ordinates with axes X and Y being determined by the expressions:

$$x = d \cdot \frac{\sin \phi \cdot \sin \theta \left( \cos^2 \theta + \frac{1}{1 + \cos \phi} \right)}{\sin^2 \theta + \cos \phi \cdot \cos^2 \theta}$$

and $$y = d \cdot \frac{\sin \phi \cdot \cos^3 \theta}{\sin^2 \phi + \cos \phi \cdot \cos^2 \theta}$$

where $\theta$ is varying from zero to $\pm \pi$.

In testimony whereof he hereunto affixes his signature.

DITLEV BERG.